US010061176B2

(12) United States Patent
Snow et al.

(10) Patent No.: US 10,061,176 B2
(45) Date of Patent: *Aug. 28, 2018

(54) ELECTROCHROMIC DEVICES AND RELATED PRODUCTS AND METHODS (71) Applicants: Alliance for Sustainable Energy, LLC, Golden, CO (US); e-Chromic Technologies, Inc., Boulder, CO (US)

(72) Inventors: Timothy Snow, Colorado Springs, CO (US); Judith McFadden, Broomfield, CO (US); Robert C. Tenent, Broomfield, CO (US)

(73) Assignees: Alliance for Sustainable Energy, LLC, Golden, CO (US); e-Chromic Technologies, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,778

(22) Filed: Dec. 18, 2017

(65) Prior Publication Data
US 2018/0120660 A1    May 3, 2018

Related U.S. Application Data (62) Division of application No. 14/769,529, filed as application No. PCT/US2014/018565 on Feb. 26, 2014, now Pat. No. 9,880,440.

(60) Provisional application No. 61/771,603, filed on Mar. 1, 2013.

(51) Int. Cl.
*G02F 1/15* (2006.01)
*G02F 1/153* (2006.01)
*E06B 9/24* (2006.01)

(52) U.S. Cl.
CPC .............. *G02F 1/153* (2013.01); *E06B 9/24* (2013.01); *G02F 1/1506* (2013.01); *E06B 2009/2464* (2013.01)

(58) Field of Classification Search
CPC ........ G02F 1/153; G02F 1/155; G02F 1/1523; G02F 1/163; G02F 1/1533; G02F 2201/122; G02F 2001/1536; G02F 1/13439; G02F 2001/1512; G02F 1/15; G02F 1/1506; G02F 1/1508; G02F 1/01; G02F 1/0121; G02F 2001/133342; G02F 2201/14; G02F 2202/16
USPC ............... 359/237, 245, 265–267, 270–275, 359/290–292, 295, 298, 315, 321, 322
See application file for complete search history.

(56) References Cited

U.S. PATENT DOCUMENTS

| | | | |
|---|---|---|---|
| 6,094,292 | A | 7/2000 | Goldner et al. |
| 6,420,071 | B1 | 7/2002 | Lee et al. |
| 7,265,891 | B1 | 9/2007 | Demiryont |
| 7,632,602 | B2 | 12/2009 | Lee et al. |
| 7,679,810 | B2 | 3/2010 | Fuss et al. |

(Continued)

OTHER PUBLICATIONS

International Search Report and Written Opinion for International Application No. PCT/US2014/018565, dated Jun. 9, 2014, pp. 1-12.

*Primary Examiner* — Brandi Thomas
(74) *Attorney, Agent, or Firm* — John C. Stolpa (57) ABSTRACT

An electrochromic device may be switchable between a transparent state and at least one reflective state. A lithium-containing reflective feature may form when the electrochromic device is switched from the transparent state to the reflective state. Various products and methods may involve the electrochromic device.

20 Claims, 5 Drawing Sheets

(56) References Cited

U.S. PATENT DOCUMENTS

| | | |
|---|---|---|
| 7,704,555 B2 | 4/2010 | Demiryont |
| 8,031,389 B2 | 10/2011 | Wang et al. |
| 9,880,440 B2 * | 1/2018 | Snow ..................... G02F 1/153 |
| 2002/0076616 A1 | 6/2002 | Lee et al. |
| 2007/0292606 A1 | 12/2007 | Demiryont |
| 2009/0323158 A1 | 12/2009 | Wang et al. |
| 2009/0323161 A1 | 12/2009 | Fuss et al. |
| 2010/0079845 A1 | 4/2010 | Wang et al. |
| 2012/0147448 A1 | 6/2012 | Yaniv et al. |
| 2012/0218621 A1 | 8/2012 | Kwak et al. |

* cited by examiner

ELECTROCHROMIC DEVICES AND RELATED PRODUCTS AND METHODS

CROSS-REFERENCE TO RELATED APPLICATIONS

This application is a divisional filing of U.S. application Ser. No. 14/769,529, filed Aug. 21, 2015, which is a national stage entry of International Application No. PCT/US14/18565, filed Feb. 26, 2014, which claims priority to U.S. Provisional Application No. 61/771,603, filed Mar. 1, 2013. The contents of each listed application are incorporated by reference in their entirety.

CONTRACTUAL ORIGIN

The United States Government has rights in this invention under Contract No. DE-AC36-08GO28308 between the United States Department of Energy and the National Renewable Energy Laboratory managed and operated by the Alliance for Sustainable Energy, LLC.

BACKGROUND

An electrochromic property is a property of some materials in which light transmissivity (also referred to as light transmittance) through the material may be modified by applying electrical energy to the material. Devices that incorporate materials with electrochromic properties have significant potential for use in window applications. This is driven by the ability of these devices to change their optical properties in a controlled fashion with application of electrical energy. This feature can be used to control the amount of sunlight that enters into buildings through windows in response to changing external conditions throughout the day and year. Some barriers to commercial implementation of electrochromic products include difficulties associated with achieving repeatable switchability through many cycles between a high light transmittance state and a low light transmittance state, stability of materials and thermal energy that may be generated in materials during use. These foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with devices, products and methods that are meant to be exemplary and illustrative, not limiting in scope. In various embodiments, one or more of the above-described problems have been reduced or eliminated, while other embodiments are directed to other improvements.

Light absorption and light reflection are two different mechanisms by which electrochromic materials may inhibit transmission of light when in a low light transmittance state. All electrochromic materials may include some level of absorption and reflection, but materials may often be classified as either absorptive or reflective based on the primary mechanism for blocking transmission of light through the material when in a low light trasmittance state. Absorptive electrochromic materials change color from a transparent "bleached" state to a low transmittance tinted state. In the tinted state, the absorptive electrochromic material absorbs a much larger portion of incident light than it does in the bleached state, so that little light passes through the material and the material. Reflective electrochromic materials change from a transparent state to a reflective state in which the material becomes significantly more reflective of incident light, significantly reducing the amount of incident light that passes through the material. With absorptive electrochromic materials, the absorbed light generates considerable thermal energy that may detrimentally heat interior space of a structure, such as in a building or transportation vehicle, or may detrimentally induce excessive thermal stresses in window glass. Unlike absorptive electrochromic materials, reflective electrochromic materials do not absorb large quantities of incident light. A limitation on use of reflective electrochromic properties is reactivity of reflectance-forming materials with electrical contact materials or other materials that may be present in a device. Such reactivity may severely limit or destroy the ability of a device to be repeatedly switched between transparent and reflective states over multiple cycles, and the material may become "frozen" in a transparent or reflective state.

An electrochromic device disclosed herein includes a reflective electrochromic property. The electrochromic device may include an electrically conductive transparent metallic layer and when the electrochromic device is switched from the transparent state to the reflective state, a lithium-containing reflective feature may be formed adjacent the electrically conductive transparent metallic layer. The formation of the lithium-containing reflective feature may be reversed, and the electrochromic device may be repeatably switched between transparent and reflective states through multiple cycles. Various methods may be used to make the electrochromic device or a stack of film layers for the electrochromic device. The electrochromic device may be used for a variety of applications and a variety of products may include the electrochromic device.

In addition to the exemplary aspects and embodiments described above, further aspects and embodiments will become apparent by reference to the drawings and by study of the following descriptions

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting. Dimensions in the drawings illustrate relative positioning and interrelationship of illustrated features. Dimensions in the drawings and depictions of features are not intended to be to scale or to depict relative dimensions or sizes between various features.

DESCRIPTION

In one aspect, an electrochromic device includes a stack of film layers that is switchable between a reflective state and a transparent state through application of electrical potential across the stack. The stack may comprise at least the following layers listed in relative order within the stack:
lithium ion storage layer;
ion conductor layer; and
electrically conductive transparent metallic layer.
When the stack is switched from the transparent state to the reflective state, lithium ions move from the lithium ion storage layer into the ion conductor layer and a lithium-containing reflective feature forms adjacent the electrically conductive transparent metallic layer. When the stack is switched from the reflective state to the transparent state, the reflective feature is removed and lithium ions move from the ion conductor layer into the lithium ion storage layer.

A number of feature refinements and additional features may be applicable to this electrochromic device aspect. These feature refinements and additional features may be used individually or in any combination. As such, each of the following features may be, but are not required to be, used with any other feature or combination of such electrochromic device aspect or any other aspect.

As will be appreciated, lithium ions that move into and out of the lithium ion storage layer when the stack is switched between transparent and reflective states do not necessarily move to or from the lithium-containing reflective feature. Rather, as the stack switches between the states, lithium ions may move or "shift" into and out of the lithium ion storage layer relative to the ion conductor layer.

The stack may include one or more layers in addition to those listed, which additional layers may be disposed to one side of a listed layer and/or between any of the listed layers. Any such additional layers should not be incompatible with those listed layers or electrochromic operation of the stack. One or more of the listed layers, or other layers, may be comprised of multiple sub-layers having different compositional or physical properties. Any or all of the layers of the stack may be a solid state material. Some component layers could also be of a polymeric nature. One example would be in the ion conductor layer. In addition to solid state ion conductors, multiple polymeric conductors could be employed. Either solid polymer electrolytes or gel electrolyte formulations would be applicable. Some specific examples are adducts of polymers such as polyethylene oxide, polypropylene oxide and polyethylene imine with lithium salts which are known lithium ion conductor systems. In addition, gel polymer electrolytes can be employed which consist of lithium salts dissolved in organic solvents and then impregnated within a polymeric film. A specific example would be a film of polymethylmethacrylate that is impregnated with a solution of lithium perchlorate dissolved in propylene carbonate. Use of a polymeric layer for one or more of the layers may be beneficial in particular for embodiments in which flexibility of the stack is desired.

At least when the stack is in the transparent state, the ion conductor layer may adjoin the electrically conductive transparent metallic layer, and there may be no intervening layer disposed between the ion conductor layer and the electrically conductive transparent metallic layer. Lithium in the lithium-containing reflective feature may be in a form other than in an alloy. The lithium-containing reflective feature may be in the absence of a lithium alloy. The lithium-containing reflective feature may be a reflective lithium metal feature, a reflective feature of lithium metal that imparts reflectance. Lithium metal is lithium in elemental form not alloyed with another metal component. The lithium-containing reflective feature may be essentially free of or in the absence of any metallic component other than lithium metal (e.g., may be free of antimony, bismuth, nickel; may be free of any alloys, whether between lithium and one or more other metals or between two or more metals not including lithium). When the stack is in the reflective state, the portion of the stack including the electrically conductive transparent metallic layer and layers between the electrically conductive transparent metallic layer and the lithium ion storage layer may be free or essentially free of any metallic component other than lithium metal (e.g., free of antimony, bismuth, nickel; free of any alloys, whether between lithium and one or more other metals or between two or more metals not including lithium). Metallic components include metals and alloys between two or more metals. When the stack is in the reflective state, the stack may have a reflectance of visible light incident upon the lithium-containing reflective feature of at least 70 percent, at least 75 percent, at least 80 percent or at least 85 percent. In the transparent state, the stack may have a reflectance of visible light of not greater than 30 percent, not greater than 25 percent, not greater than 20 percent or not greater than 15 percent. Such incident visible light may be incident upon the lithium-containing reflective feature in a direction from the electrically conductive transparent metallic layer. When reference is made herein to a characteristic in relation to visible light (e.g., transmissivity or reflectance of visible light) the reference is in relation to visible light at the representative wavelength of 550 nm. As used herein, reflectance refers to total reflectance (total fraction of incident light that is reflected) including due to specular reflection and due to diffusive reflection.

When the stack is in the reflective state, the lithium-containing reflective feature may adjoin the electrically conductive transparent metallic layer. The reflective feature may be disposed at least in part in a portion of the ion conductor layer adjacent the electrically conductive transparent metallic layer. The reflective feature may be disposed partially, entirely or essentially entirely within the ion conductor layer adjacent the electrically conductive transparent metallic layer. At least a portion of the reflective feature may be in a thin film that forms between the ion conductor layer and the electrically conductive transparent metallic layer. When the stack is in the reflective state, the stack may consist of or consist essentially of only the following disposed between the electrically conductive transparent metallic layer and the lithium ion storage layer: the ion conductor layer and the lithium-containing reflective feature. The reflective feature, in the reflective state, may include a layer of lithium metal, which may be entirely or partially within the ion conductor layer. The layer of lithium metal in a reflective state may having a thickness of at least 25 nm, at least 50 nm, at least 100 nm or larger, which thickness of the layer of lithium metal includes the thickness of any thin film of the lithium metal disposed between the ion conductor layer and the electrically conductive transparent metallic layer and the total depth into the ion conductor layer to which any of the lithium metal may extend. As will be appreciated, a larger thickness of a layer of lithium metal will generally have a higher reflectance than a thinner layer. When the stack is in the transparent state, the stack may be in the absence of any layer disposed between the ion conductor layer and the electrically conductive transparent metallic layer.

The stack may comprise a second electrically conductive transparent layer disposed on a side of the lithium ion storage layer opposite the ion conductor layer. Such a second electrically conductive transparent layer may be of or include a transparent conducting oxide (e.g., indium tin oxide, fluorine doped tin oxide, aluminum doped zinc oxide). Such a second electrically conductive transparent layer may be of a transparent metallic material, which may be a metal or an alloy of two or more metals (e.g., nickel metal, palladium metal, platinum metal, gold metal, silver metal, copper metal, molybdenum metal, chromium metal, tungsten metal or an alloy including any of these listed metals and/or other metals). The second electrically conductive transparent layer may be continuous or discontinuous. For example, the second electrically conductive transparent layer may be in the form of a pattern or network (which may be random), for example of small metallic line features. For example, such a second electrically conductive transparent layer may include a grid of silver nanowires. At least when in the transparent state, the stack may consist of or consist essentially of only the following layers disposed between the electrically conductive transparent metallic layer and the second electrically conductive transparent layer: the lithium ion storage layer and the ion conductor layer. When the stack is in the transparent state, the stack may have transmissivity to visible light of at least 40 percent, at least 45 percent, at least 50 percent, at least 55 percent or at least 60 percent through the portion of the stack including the electrically conductive transparent metallic layer, such a second electrically conductive transparent layer and all layers of the stack disposed between the electrically conductive transparent metallic layer and the second electrically conductive transparent layer. When the stack is in the reflective state, the stack may have transmissivity of visible light of no greater than 30 percent, no greater than 25 percent, no greater than 20 percent or no greater than 15 percent through a portion of the stack including the electrically conductive transparent metallic layer, such a second electrically conductive transparent layer and all layers of the stack disposed between the electrically conductive transparent metallic layer and the second electrically conductive transparent layer.

The stack may have multiple reflective states between which the stack may be switched, and the stack in each of these reflective states may be less transmissive to at least some wavelengths of light than in the transparent state. For example, the stack may have a second reflective state that exhibits an intermediate level of light transmissivity over at least some wavelengths relative to the transparent state and the reflective state. For example the reflective state as described above may be a first reflective state and the stack may be switchable between the first reflective state, the transparent state and at least a second reflective state that is less reflective than the first reflective state. The transparent state may be as described above. When the stack is in the transparent state the stack may have transmissivity characteristics in relation to visible light as described above and the stack may have transmissivity to infrared light of at least 35 percent, at least 40 percent or at least 50 percent, at least 55 percent or at least 60 percent through the portion of the stack including the electrically conductive transparent metallic layer, a second electrically conductive transparent layer and all layers of the stack disposed between the electrically conductive transparent metallic layer and the second electrically conductive transparent layer. When the stack is in such a second reflective state, the stack may have transmissivity to visible light of at least 40 percent, at least 45 percent, at least 50 percent or at least 55 percent and may have transmissivity to infrared light of not greater than 30 percent, not greater than 25 percent, not greater than 20 percent or not greater than 15 percent through the portion of the stack including the electrically conductive transparent metallic layer, a second electrically conductive transparent layer and all layers of the stack disposed between the electrically conductive transparent metallic layer and the second electrically conductive transparent layer. In the first reflective state, the stack may have transmissivity to infrared light of not greater than 25 percent, not greater than 20 percent, not greater than 15 percent or not greater than 10 percent through such portion of the stack. When reference is made herein to a characteristic in relation to infrared light (e.g., transmissivity or reflectance of infrared light), the reference is in relation to infrared light at the representative wavelength of 1250 nm.

For some implementations, in a first reflective state the stack may have a reflectance of visible light incident upon the lithium-containing reflective feature of at least 70 percent, at least 75 percent, at least 80 percent or at least 85 percent, and the stack may have a reflectance of infrared light incident upon the lithium-containing reflective feature of at least 70 percent, at least 75 percent, at least 80 percent or at least 85 percent; and when the stack is in a second reflective state, the stack may have a reflectance to visible light incident upon the lithium-containing feature of not greater than 35 percent, not greater than 25 percent or not greater than 20 percent, and the stack may have a reflectance to infrared light incident upon the lithium-containing reflective feature of at least 60 percent, at least 65 percent, at least 70 percent or at least 75 percent. When a high level of transmissivity of infrared light through the stack is desired in the transparent state, for example for interior space heating, it may be preferable that the second electrically conductive transparent layer be of a material that is not a substantially barrier to transmission of infrared light. Thin metallic materials may be preferred in such cases, with one more preferred example being silver nanowires. The stack may have any number of reflective states of varying reflectivity into which the stack may be switched. As will be appreciated, such different reflective states may correspond with different thicknesses of the lithium-containing reflective feature, with a more reflective state corresponding with a thicker layer of the reflective feature than the thickness of the layer for a less reflective state. Also, when the stack is designed with more than two switchable states, it should be appreciated that the stack may be switched directly from any such state to any other such state.

To switch the stack between any two switchable states of the stack, sufficient electrical energy may be supplied to the stack with correct polarity to cause movement of charge (and consequently movement of material) in the stack sufficient to reconfigure the stack from one state to another desired state. Electrical energy supplied to the stack to switch between states must be sufficient to move sufficient charge within the stack to effect the desired change. For example, starting from a transparent state and injecting a charge density into the stack of approximately 1.54 coulombs per square centimeter of stack area may form an amount of lithium metal in the stack equivalent to about a 43 nm thick lithium metal film, whereas starting from a transparent state and injecting a charge density to the stack of approximately 3.58 coulombs per square centimeter of stack area may form an amount of lithium metal in that stack equivalent to about a 100 nm thick lithium metal film. From either of these states, the stack could be returned to a transparent state by removing an equivalent charge density from the stack. The electrical potential may be applied at a constant voltage, a constant current or a varying voltage and/or current. Once in a state, the stack will ordinarily remain in that state in the absence of application of electrical energy (e.g., open circuit to the stack), until sufficient electrical energy is supplied to the stack to move sufficient charge (and consequently material) within the stack to reconfigure the stack back to the original state or to yet another state. In the absence of applied electrical energy sufficient to switch the stack out of a state, the stack may remain in that state indefinitely. For example, in the transparent state the lithium-containing reflective feature may be completely absent next to the electrically conductive transparent metallic layer, in a first reflective state the lithium-containing reflective feature may be present at a first thickness and in a second reflective state the lithium-containing reflective feature may be present at a second thickness that is smaller than the first thickness. In the event that the stack may tend to "bleed" back toward transparency from a reflective state, a small amount of electrical energy may continue to be applied to the stack to prevent such an effect and to hold the stack in the state of desired reflectivity. The stack may have many different reflective states between which the stack may be switchable, which may correspond with different thicknesses of a lithium-containing reflective feature, as noted above. As an example of this effect, a 1.3 nm thick film of pure lithium metal may reflect less than 15% of visible light at a wavelength of 550 nm and less than 10% of infrared light at a wavelength of 1200 nm, whereas a 43 nm thick film may reflect about 20% of the visible light at a wavelength of 550 nm and over 70% of the infrared light at a wavelength of 1200 nm, and a film of perhaps a micron or more in thickness may reflect over 80% of both visible light at 550 nm and infrared light at 1200 nm. This example is presented using 1200 nm as a representative infrared wavelength because of reported data covering that wavelength, but performance at 1250 nm would be expected to be similar. In the stack, a layer of lithium metal achieving similar performance in terms of reflectance may have a larger thickness than this example, because in the stack the lithium layer may not in all cases be present as a separate distinct film of pure lithium. Rather, as noted above, at least a portion of the lithium layer of a reflective feature in the stack may occupy a portion of the ion conductor layer, and so may exhibit a smaller "effective thickness" in terms of reflectance than if a uniform film of pure lithium metal were present having a thickness equal to the depth within the ion conductor layer to which the actual lithium reflective feature may extend.

The electrically conductive transparent metallic layer may include a metallic component of a metal or alloy of two or more metals (e.g., nickel metal, palladium metal, platinum metal, gold metal, silver metal, copper metal, molybdenum metal, chromium metal, tungsten metal or an alloy including any of these listed metals and/or other metals, provided that the electrically conductive transparent metallic feature should preferably be highly stable in the presence of lithium metal). The electrically conductive transparent metallic layer may include a member selected from the group consisting of nickel, platinum and palladium. The electrically conductive transparent metallic layer may consist essentially of nickel metal or may consist essentially of nickel-containing alloy. The electrically conductive transparent metallic layer may be a continuous or discontinuous layer. For example, the electrically conductive transparent metallic layer may be in the form of a grid, for example of small metallic line features. For example, the electrically conductive transparent metallic layer may include a grid of silver nanowires or a grid of nickel-clad silver nanowires. The electrically conductive transparent metallic layer may have transmissivity to visible light of at least 50 percent, at least 55 percent, at least 60 percent or at least 65 percent.

The ion conductor layer may comprise any solid state, solid polymer or gel electrolyte for conducting lithium ions, for example such as may be used in lithium-ion batteries. Such a solid state electrolyte may include one of more of the following: lithium phosphorous oxynitride (also referred to as LiPON materials), lithium aluminum fluoride, and members of the Lisicon family of lithium ion conductors or other lithium ion conducting thin films, such as lithium lanthanum titanate, lithium containing sulfide glasses such as $Li_2S$—$SiS_2$—$Li_4SiO_4$, lithium conducting garnets such as $Li_5La_3M_2O_{12}$ where M=Ta, Nb) and the like. Some example LiPON materials have a formula of $Li_xPO_yN_z$, where x=2y+3z−5. Some LiPON materials may be formed in a film by sputtering deposition of $Li_3PO_4$ in a nitrogen environment, which may form a glassy, amorphous film. A crystalline LiPON electrolyte material of formula $Li_2PO_2N$ has been reported to have been made by chemical reaction of precursor materials $Li_2O$, $P_2O_5$ and $P_3N_5$ (Senevirathane et al.; A new crystalline LiPON electrolyte: Synthesis, properties, and electronic structure; Solid State Ionics 233 (2013) 95-101). Examples of some polymeric ion conductors include mixtures of lithium salts with polyethylene oxide based polymers and others known commonly under the title "solid polymer electrolytes". In addition, gel electrolyte formulations may be employed that consist of blends of polymer materials, lithium salts and liquid materials. An example of this class of gel electrolyte systems is a blend of polymethylmethacrylate with lithium percholorate and propylene carbonate. A liquid component of these gel electrolytes could be an organic solvent or a molten salt material such as those commonly referred to as room temperature ionic liquids.

The lithium ion storage layer may be any solid state material for storing lithium ions at least when the stack is in the transparent state and releasing such lithium ions into the ion conductor layer when the stack is switched from the transparent state to the reflective state. The lithium ions may be lithium cations ($Li^+$). The lithium ions may be intercalated within the lithium ion storage layer. The lithium ion storage layer may include a transition metal oxide. The lithium ion storage layer may include one or more of the following materials: lithium nickel tungsten oxide, other forms of nickel oxide with alternative doping materials replacing tungsten (e.g., Mg, Al, Si, V, Zr, Nb, Ag, Ta, Ti), iridium oxide, cerium oxides and forms of either of these oxides doped with any of the aforementioned materials. The lithium ion storage layer may have an absorptive electrochromic property, and may change from a transparent to a tinted state when the lithium-containing reflective feature forms. Such an absorptive electrochromic layer may be designed for product applications to face an interior space when the product is installed in a structure having such an interior space, so that people inside the interior space will see the color of the tinted state of the absorptive layer rather than the lithium-containing reflective feature when the stack is in the reflective state.

When reference is made in this disclosure to a window, window product of the like installed or installable in a structure, the structure could be any structure. The structure may have an interior space, such as a structure in the form of a building or a transportation vehicle. Such a building may be for example, a residential, commercial, institutional, industrial or other building. Such a transportation vehicle may be an automobile (e.g., car or truck), water craft (e.g., boat or ship), aircraft (e.g., airplane or helicopter) or spacecraft.

In another aspect, an electrochromic window product includes a rigid transparent window sheet and an electrochromic device of the above aspect disposed to cover at least a portion of one side of the rigid transparent window sheet. By covering a side of the window, the electrochromic device when in a reflective state may significantly reduce the amount of sunlight incident on the electrochromic device that passes into the interior of a structure through the window.

A number of feature refinements and additional features may be applicable to this electrochromic window product aspect. These feature refinements and additional features may be used individually or in any combination. As such, each of the following features may be, but are not required to be, used with any other feature or combination of such electrochromic window product aspect or any other aspect.

The electrochromic device of this electrochromic window product aspect may be according to, or may have any one or more features described in relation to, the electrochromic device aspect.

The rigid transparent window sheet may be a sheet of glass or rigid plastic (polymeric) composition. The terms "polymeric" and "plastic" are used interchangeably herein.

The electrochromic device may adjoin the rigid transparent window sheet, and may be adhered to the rigid transparent window sheet. The electrochromic device may be spaced from the rigid transparent window sheet, such as in a laminate structure. The electrochromic window product may include two or more rigid transparent window sheets. The electrochromic device may be disposed between two rigid transparent window sheets, in which case the electrochromic device may be laminated between the two rigid transparent window sheets, may be laminated with one of the rigid transparent window sheets and spaced from the other rigid transparent window sheet or may be spaced from both of such rigid transparent window sheets. Such rigid transparent window sheets may be sealed with a window frame to form at least a portion of a protective enclosure in which the electrochromic device may be disposed.

The electrochromic window product may have an exterior side designed to face an exterior environment (outside of a structure) when the window product is installed in a structure. The electrically conductive transparent metallic film of the electrochromic device may be disposed toward such an exterior side relative to the lithium ion storage layer, so that sunlight passing through the window product may encounter the electrically conductive layer prior to encountering the ion storage layer.

A method of installing a window in a structure may include installing in the structure such an electrochromic window product.

In another aspect, an electrochromic product includes a flexible sheet with an electrochromic device of the electrochromic device aspect disposed between two flexible transparent substrates.

A number of feature refinements and additional features may be applicable to this electrochromic product aspect. These feature refinements and additional features may be used individually or in any combination. As such, each of the following features may be, but are not required to be, used with any other feature or combination of such electrochromic product aspect or any other aspect.

The electrochromic device of this electrochromic product aspect may be according to, or may have any one or more features described in relation to, the electrochromic device aspect. The flexible substrates may be flexible plastic (polymeric) sheets. The electrochromic product may be a window retrofit product, which may be used to provide electrochromic functionality to an existing window.

A method for retrofitting a window to include electrochromic functionality may include adhering such a window retrofit product to a surface of the window. The window may be in-place in a structure during the adhering, or the window may not be installed in a structure during the adhering. The window retrofit product may be adhered to an interior surface of the window that faces an interior of a structure when the window is installed in the structure, with the electrochromic device oriented with the electrically conductive transparent layer disposed toward the interior surface of the window relative to the lithium ion storage layer.

In another aspect, an electrochromic window system includes a stack of film layers connected with an electrical power source, wherein the stack is switchable between a reflective state and a transparent state through controlled application of electrical potential across the stack by the electrical power source. A controller is connected with the electrical power source to control application of electrical energy from the electrical power source to the stack to switch the stack between the reflective state and the transparent state.

A number of feature refinements and additional features may be applicable to this electrochromic window system aspect. These feature refinements and additional features may be used individually or in any combination. As such, each of the following features may be, but are not required to be, used with any other feature or combination of such electrochromic window system aspect or any other aspect.

The stack may be a stack as described in relation to the electrochromic device aspect or may include any feature or features or performance characteristics described relation to the electrochromic device aspect. When the electrical power source is controlled by the controller to provide electrical energy to the stack to switch the stack from the transparent state to the reflective state, lithium ions may move from a lithium ion storage layer into an ion conductor layer and a reflective lithium metal feature may form adjacent an electrically conductive transparent metallic layer. When the electrical power source is controlled by the controller to provide electrical power to the stack to switch the stack from the reflective state to the transparent state, the reflective lithium metal feature may be removed and lithium ions may move from the ion conductor layer into the lithium ion storage layer.

The reflective state may be a first reflective state and the stack may be switchable between the first reflective state, the transparent state and a second reflective state through controlled application of electrical potential across the stack by the electrical power source, wherein the second reflective state may be less reflective than the first reflective state. Such a first reflective state and/or second reflective state may be or have features as described in relation to the electrochromic device aspect. When the electrical power source is controlled by the controller to provide electrical energy to the stack to switch the stack from the transparent state to the second reflective state, lithium ions may move from a lithium ion storage layer into an ion conductor layer and a lithium-containing reflective feature (e.g., reflective lithium metal feature) may form adjacent an electrically conductive transparent metallic layer to a thickness that is smaller than a thickness for the first reflective state. When the electrical power source is controlled by the controller to provide electrical energy to the stack to switch the stack from the first reflective state to the second reflective state, the lithium-containing reflective feature may be reduced in thickness and lithium ions may move from the ion conductor layer into the lithium ion storage layer.

The stack may be in an electrochromic device of the electrochromic device aspect. The stack may be in an electrochromic window product of the electrochromic window product aspect. The stack may be in a window retrofit product of the window retrofit product aspect.

The electrical power source may include an electrical system of a building, for example powered by an electrical grid, an on-site electrical power generator (including photovoltaic or wind generators) or on-site electrical energy storage (e.g., battery). The electrical power source may include an electrical system of a transportation vehicle, for example including electrical energy storage (e.g., battery) or an on-board electrical power generator. The electrical power source may include electrical circuitry (e.g., including switches, potentiometers) that may be manipulable by the controller to control supply of electrical energy from the electrical power source to the stack. Control of supply of electrical power to the stack may include occasionally supplying electrical power of a controlled quantity to effect a switching between different states of the stack. Between such occurrences of switching, the electrical power source may provide no electrical energy to the stack. The controller may include a manually manipulable control unit with hand manipulable controls (e.g., dials, buttons or touch screen) to permit a user to manually instruct the controller to control application of electrical energy from the electrical power source to the stack. The controller may include an automated control unit, such as an automated building or transportation vehicle environmental control system. The controller may include a processor and memory logically connected to the processor, with the memory including a set of computer readable instructions executable by the processor to direct control of delivery of electrical energy from the electrical power source to the stack based on one or more monitored or tracked conditions of one or more of an interior space, exterior environment or object (e.g., measured temperature, insolation or radiation in relation to a space or object, occupied or non-occupied condition of an interior space or time of day or night). The controller may be connected with one or more sensors that provide information to the controller concerning such a condition. The window system may include a single window or multiple windows with an electrochromic device connected with electrical power source and electrical energy to each of which is controlled by the controller. The controller may be local to the structure (e.g., is a part of or located within or proximate to the structure) or may be remote from the structure. The controller may be connected with the electrical power source through wiring or wireless connection.

In another aspect, a method for making an electrochromic device includes:

preparing a stack of film layers, the stack comprising at least the following layers listed in relative order within the stack:

lithium ion storage layer comprising lithium ions;
ion conductor layer; and
electrically conductive transparent metallic layer;

wherein the ion conductor layer adjoins the electrically conductive transparent metallic layer.

A number of feature refinements and additional features may be applicable to this method aspect. These feature refinements and additional features may be used individually or in any combination. As such, each of the following features may be, but are not required to be, used with any other feature or combination of such method for making aspect or any other aspect.

The electrochromic device of this method for making aspect may be according to, or may have any one or more features described in relation to, the electrochromic device aspect.

The method may include, after preparing the stack, forming in the stack a lithium-containing reflective feature adjacent a side of the electrically conductive transparent metallic layer disposed toward the ion conductor layer. Such forming may include applying an electrical potential across the stack to shift lithium ions across the stack layers through the ion conductor layer toward the electrically conductive transparent metallic layer and to form the lithium-containing reflective feature.

Preparing the stack may include forming the ion conductor layer and the electrically conductive transparent metallic layer without an intervening layer disposed between the ion conductor layer and the electrically conductive metallic transparent layer. A lithium-containing reflective feature may be formed in the stack adjacent the electrically conductive metallic transparent layer even in the absence of a pre-existing deposited layer between the electrically conductive transparent metallic layer and the ion conductor layer. This may be advantageous both to reduce the number of layers that may need to be deposited during the preparing of the stack and also eliminates a layer that may reduce transmittance of light through the stack when the stack is in the transparent state.

Preparing the stack may include sequential deposition of film layers over a base support substrate on which the deposited film layers and a final stack are supported. The base substrate may be a rigid substrate (e.g., glass, rigid plastic sheet) or a flexible substrate (e.g., flexible plastic sheet). Preparing the stack may include depositing a first layer over at least a portion of the base substrate and then depositing one or more additional layers over the first layer. When the first layer is deposited, the base supporting substrate may already have pre-deposited thereon one or more film layers that may form a part of or may be separate from the stack. The base supporting substrate may have pre-deposited thereon a transparent conducting oxide, which may serve as a second electrically conductive transparent layer of the stack. The stack may be built up on a base supporting substrate in a direction from the electrically conductive transparent metallic layer toward the ion storage layer or in a direction from the ion storage layer toward the electrically conductive transparent metallic layer. The method may include, after preparing the stack, covering a side of the stack opposite the base support substrate with a transparent protective layer (e.g., glass or polymeric protective material).

The method may include depositing the layers by any technique. Any of the layers may be made by any deposition technique, which may include a liquid or non-liquid technique. Some techniques for depositing any one or more of the layers include Physical Vapor Deposition, Chemical Vapor Deposition, Molecular Layer Deposition, Atomic Layer Deposition, Ebeam evaporation, electrodeposition and solution phase spay deposition. Liquid phase processing techniques common to use in roll to roll processing methods may be employed in large format roll to roll processing methods. Examples of such methods include slot-die coating, chemical bath deposition gravure coating, knife edge coating and the like. Additionally common printing techniques such as silk screen printing or ink jet printing may be employed.

Further exemplary description and illustration of these and other aspects, embodiments and features are provided below with reference to the drawings.

Figure 1A:
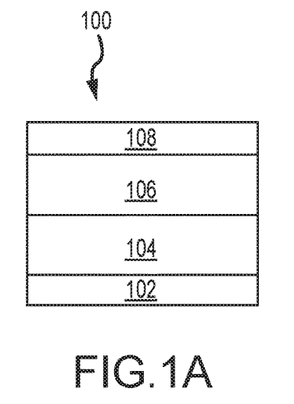
FIGS. 1A and 1B illustrate an example stack of films with electrochromic reflective properties.
Figure 1B:
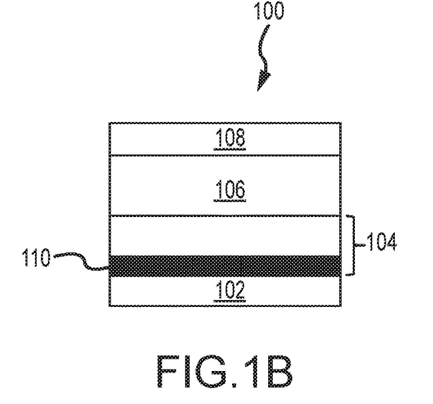

FIGS. 1A and 1B show an example stack 100 of film layers that may be or be used as part of an electrochromic device. The stack 100 is shown in a transparent state in FIG. 1A and in a reflective state in FIG. 1B. As shown in FIG. 1A, when the stack 100 is in the transparent state the stack 100 includes an electrically conductive transparent metal layer 102, an ion conductor layer 104, a lithium ion storage layer 106 and a second electrically conductive transparent layer 108. As shown in FIG. 1B, when the stack 100 is in the reflective state, the stack includes a lithium-containing reflective feature 110 that forms when the stack 100 is converted from the transparent state to the reflective state. The electrically conductive transparent metallic layer 102 and the second electrically conductive transparent layer 108 provide convenient contacts for connecting the stack 100 to an electrical power source to apply an electric potential across the stack 100 to switch the stack 100 between the transparent state and the reflective state, with the direction of the electrical potential being in a reverse direction for switching from the reflective to transparent state relative to for switching from the transparent to reflective state. When the stack is switched from the transparent state to the reflective state, lithium ions (cations) move out of the lithium ion storage layer 106 and into the ion conductor layer 104 toward the electrically conductive transparent metal layer 102. Lithium ions may be reduced during the formation of the reflective feature 110. When the stack 100 is switched from the reflective state to the transparent state, the reflective feature 110 dissipates, or is removed, and lithium ions move from the ion conductor layer 104 into the lithium ion storage layer 106, where such lithium ions may reside when the stack 100 is in the transparent state. The reflective feature 110 may form at least in part within the volume of the ion conductor layer 104 that is adjacent to the electrically conductive transparent metallic layer 102. FIG. 1B shows for example essentially all of the reflective feature 110 disposed within the volume of the ion conductor layer 104. Alternatively, some or all of the reflective feature 110 may shift the positioning of other layers within the stack 100 when the reflective feature 110 forms, such that at least a portion of the reflective feature may form between the electrically conductive transparent metallic layer 102 and the ion conductor layer 104. The reflective feature 110 may include lithium metal that forms adjacent the electrically conductive transparent metallic layer 102. Some or all of such lithium metal may be intercalated or otherwise intermixed with other materials of the ion conductor layer 104.

Figure 2A:
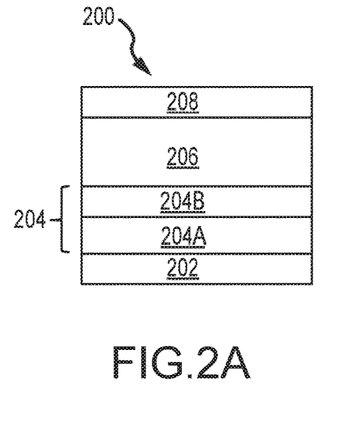
FIGS. 2A and 2b illustrate another example stack of films with electrochromic reflective properties.
Figure 2B:
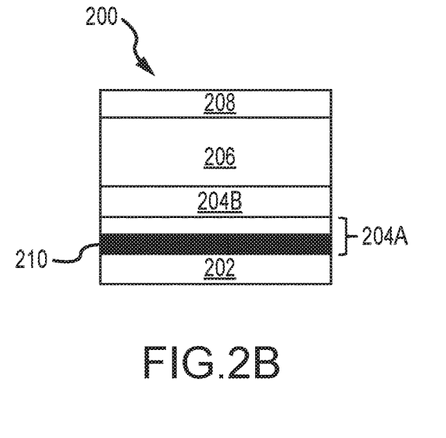

FIGS. 2A and 2B show another example stack 200 of film layers that may be or be used as part of an electrochromic device. FIG. 2A shows the stack 200 in a transparent state and FIG. 2A shows the stack 200 in a reflective state. The stack 200 includes an electrically conductive transparent metallic layer 202, an ion conductor layer 204, a lithium ion storage layer 206 and a second electrically conductive transparent layer 208. As shown in FIG. 2B, when the stack 200 is in the reflective state, the stack 200 includes a lithium-containing reflective feature 210 adjacent to the electrically conductive transparent metallic layer 202. The example stack 200 is similar to the example stack 100 shown in FIGS. 1A and 1B, but in the example stack 200 the ion conductor layer 204 includes two sub-layers 204A and 204B. As one example, a first sub-layer 204A may be of a first solid electrolyte material with enhanced stability in relation to effective and repeated formation and dissipation of the reflective feature 210 and a second sub-layer 204B may be a solid electrolyte material for enhanced conductivity of lithium ions from the lithium ion storage layer 206 and/or for better compatibility with the lithium ion storage layer 206. As one possible specific example for the ion conductor layer 204, a first sub-layer 204A may include lithium phosphorous oxynitride and a second sub-layer 204B may include lithium aluminum fluoride. As one specific example for the stack 200, the electrically conductive transparent metallic layer may be a 3 to 10 nm layer of nickel metal, the ion conductor layer 204 may be a 200 to 1000 nanometer layer including a first sub-layer 204A of lithium phosphorous oxynitride and a second sub-layer 204B of lithium aluminum fluoride, the lithium ion storage layer 206 may be a 50-300 nm layer of lithium nickel tungsten oxide and the second electrically conductive transparent conductive layer may be a layer of indium tin oxide.

Figure 3:
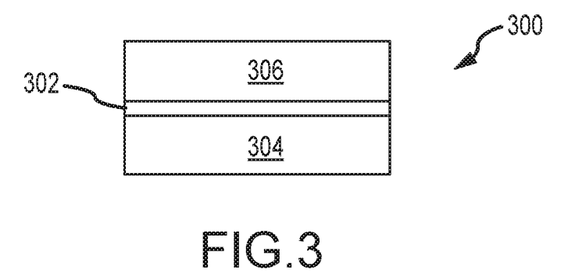
FIG. 3 illustrates an example electrochromic product.

FIG. 3 shows an example electrochromic product 300 in the form of a flexible sheet that includes an electrochromic device 302 disposed between two transparent flexible substrates 304 and 306 in a laminate structure. The electrochromic device 302 includes a stack of films to provide electrochromic functionality switchable between transparent and reflective states. For example, the electrochromic device 302 may be or include a stack of film layers as shown in FIGS. 1A and 1B or FIGS. 2A and 2B. The flexible substrates 304 and 306, for example, may be flexible plastic sheets. The electrochromic product 300 may be in the form of a window retrofit product that may be retrofitted to a window to provide electrochromic functionality to the window, or the electrochromic product 300 may be used in the manufacture of new window products. As an example, the electrochromic product 300 may be adhered to a surface of the window. When adhered to a surface of a window, the electrochromic product may be oriented with an electrically conductive transparent metallic layer disposed, relative to an ion conductor layer, toward an exterior environment of a structure when the retrofitted window is installed in a structure. In that regard, the electrochromic device 302 could be oriented on the window as installed in the structure so that incident sunlight would first encounter the electrically conductive transparent metallic layer prior to encountering the ion conductor layer. Such an orientation reduces absorption heating that might otherwise occur, for example, in the lithium ion storage layer or the lithium ion conductor layer if incident sunlight were to encounter those layers before encountering the reflective lithium metal layers. The electrochromic product 300 may be disposed on either an interior or exterior surface of the window, but for enhanced protection of the electrochromic product 300 from degradation from exposure to an exterior environment, the electrochromic product 300 may be disposed on an interior side of the window that faces the interior of the structure when the window is installed in the structure.

Figure 4:
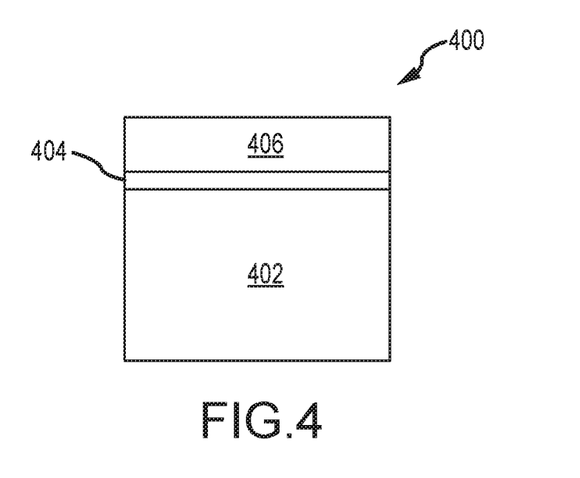
FIG. 4 illustrates an example electrochromic window product.

FIG. 4 shows an example electrochromic window product 400 including a rigid transparent window sheet 402 on which is disposed an electrochromic device 404 with electrochromic functionality to be switchable between transparent and reflective states. The electrochromic device is covered by a transparent protective layer 406. The electrochromic device 404, for example, may be or include a stack of film layers of FIGS. 1A and 1B or FIGS. 2A and 2B or may be or include the electrochromic product of FIG. 3. The rigid transparent window sheet 402, for example, may be a rigid glass or plastic sheet, such as may be used for a window pane. The protective layer 406 may be, for example, a thin polymeric or glass covering. The electrochromic window product 400 may be designed for the protective layer 406 to be disposed toward either an exterior environment or interior environment when the window product 400 is installed in a structure. In either case, the electrochromic device 404 may be oriented so that an electrically conductive transparent metallic layer of the electrochromic device 404 would be disposed toward the exterior environment relative to the ion conductor layer when the window product 400 is installed in a structure.

Figure 5:
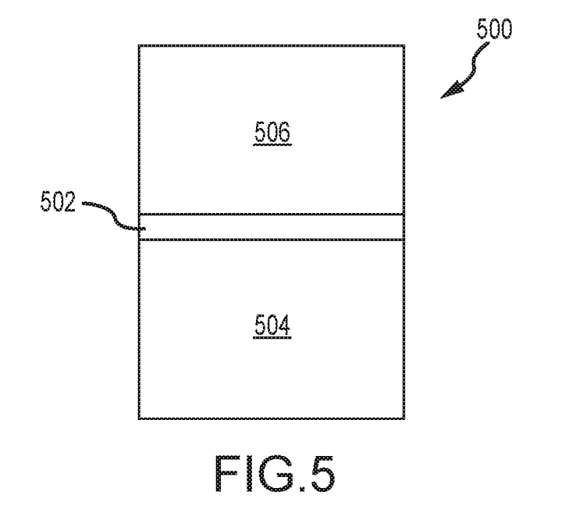
FIG. 5 illustrates another example electrochromic window product.

FIG. 5 shows an example electrochromic window product 500 including an electrochromic device 502 disposed between two rigid transparent window sheets 504 and 506 in a laminate structure. The electrochromic device 502 may be oriented so that an electrically conductive transparent metallic layer is disposed, relative to an ion conductor layer, toward a side of the window product 500 that is to face the exterior environment when installed in a structure. The electrochromic device, for example, may be or include a stack of films of FIG. 1A or 1B or FIGS. 2A and 2B or may be or include the electrochromic device of FIG. 3.

Figure 6:
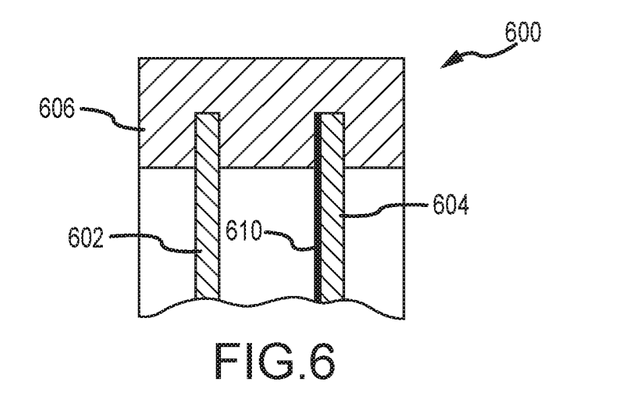
FIG. 6 shows a partial sectional view illustrating another example electrochromic window product.

FIG. 6 shows an example electrochromic window product 600 including two rigid transparent window sheets 602 and 604 retained by and sealed with a window frame 606. The rigid transparent window sheets 602 and 604 and the window frame 606 form a protective enclosure about an interior space 608 located between the rigid transparent window sheets 602 and 604. The window product 600, for example, may be a double-pane window unit. As shown in FIG. 6, an electrochromic device 610 is disposed on a surface of the rigid transparent window sheet 604 so that the electrochromic device 610 is protected within the enclosure formed by the rigid transparent window sheets 602 and 604 and the window frame 606. The electrochromic device 610, for example, may be or include the stacks of films of FIGS. 1A and 1B or FIG. 2A or 2B or may be or include the electrochromic product of FIG. 3. The combination of the rigid transparent window sheet 604 and the electrochromic device 610 may, for example, have a design of or including the electrochromic window product of FIG. 4. The electrochromic device 610 may be oriented with an electrically conductive transparent metallic layer disposed, relative to an ion conductor layer, toward a side of the window product 600 that would face an exterior environment when installed in a structure. The window product 600 may be designed for the rigid transparent window sheet 604 to be disposed toward the exterior environment and the rigid transparent window sheet 602 to be disposed toward the interior environment of a structure when the window product 600 is installed in a structure.

Figure 7:
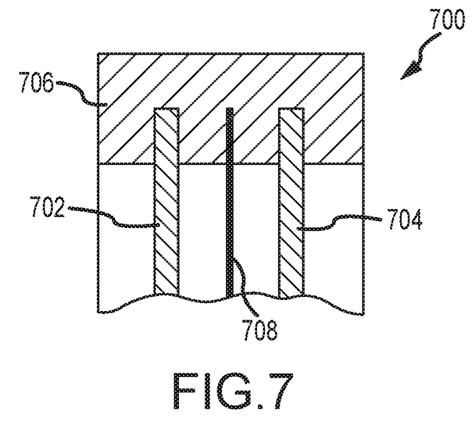
FIG. 7 shows a partial sectional view illustrating another example electrochromic window product.

FIG. 7 shows an example electrochromic window product 700 including two rigid transparent window sheets 702 and 704 retained by and sealed with a window frame 706. An electrochromic device 708 is disposed between the rigid transparent window sheets 702 and 704. The electrochromic device 708, for example, may be or include a stack of films of FIGS. 1A and 1B or FIG. 2A or 2B or may be or include the electrochromic device of FIG. 3. The window product 700 may be configured, for example, as a triple-pane window product with the middle pane provided by the electrochromic device 708, which may be in the form of a flexible or rigid sheet. In one preferred implementation, the electrochromic device 708 is oriented so that an electrically conductive transparent metallic layer is disposed toward an exterior environment relative to the ion conductor layer when the window product 700 is installed in a structure.

Figure 8:
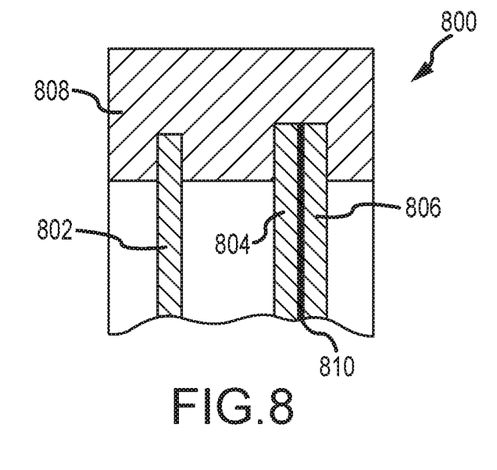
FIG. 8 shows a partial sectional view illustrating another example electrochromic window product.

FIG. 8 shows an example electrochromic window product 800 including three rigid transparent window sheets 802, 804 and 806 retained by and sealed with a window frame 808. The window product 800 includes an electrochromic device 810 disposed between the rigid transparent window sheet 804 and the rigid transparent window sheet 806 in a laminate structure. The window product 800, for example, may be in the form of a double-pane window unit with the laminate structure forming one of the window pane components. The electrochromic device 810, for example, may be or include a stack of films of FIGS. 1A and 1B or FIG. 2A or 2B or may be or include the electrochromic product of FIG. 3. The laminate structure including the rigid transparent window sheets 804 and 806 and the electrochromic device 810, for example, may have a design of or including the electrochromic window product of FIG. 5. The window product 800 may be designed with the electrochromic device 810 oriented with an electrically conductive transparent metallic layer disposed, relative to the ion conductor layer, toward a side of the window product 800 that would be disposed towards an exterior environment when the window product 800 is installed in a structure. Such an exterior side of the window product 800, for example, may be the side toward which the rigid transparent window sheet 806 is disposed.

Figure 9:
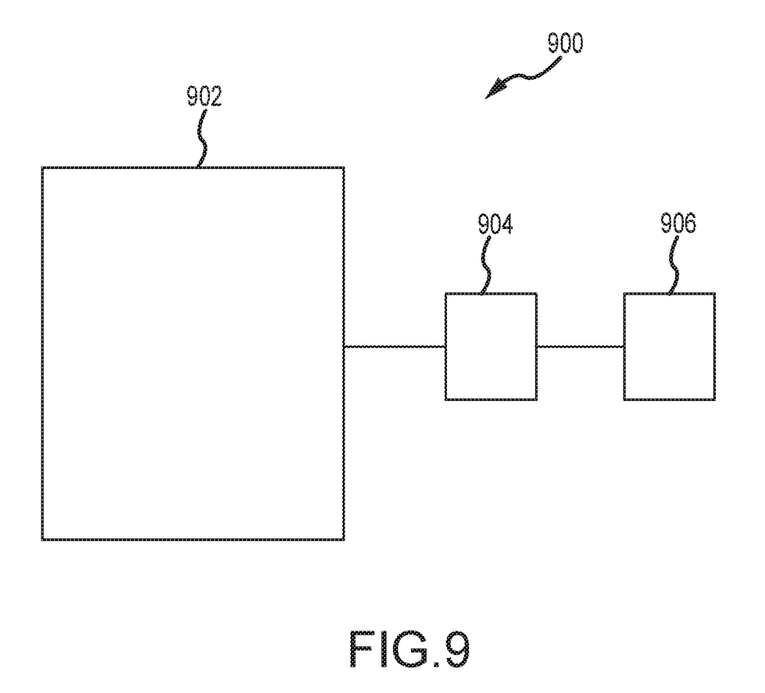
FIG. 9 illustrates an example electrochromic window system.

FIG. 9 illustrates an electrochromic window system 900 including a window 902, an electrical power source 904 and a controller 906. The window 902 includes an electrochromic device with an electrochromic stack of film layers. The stack is connected with the electrical power source 904, which is manipulable by the controller 906 to controllably provide electrical power to the window 902, and in particular to the stack of an electrochromic device of the window 902 to switch the state of the stack between at least two different switchable states (e.g., between a transparent and reflective state).

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. All examples are nonlimiting.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, the a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. An electrochromic product, comprising:
a rigid transparent window sheet; and
an electrochromic device, comprising:
a stack of film layers that is switchable between a reflective state and a transparent state through application of an electrical potential across the stack, the stack comprising at least the following:
a lithium ion storage layer;
an ion conductor layer;
an electrically conductive transparent metallic layer; and
a second electrically conductive transparent layer disposed on a side of the lithium ion storage layer opposite the ion conductor layer;
wherein:
when the stack is switched from the transparent state to the reflective state, lithium ions move from the lithium ion storage layer into the ion conductor layer and a reflective feature forms adjacent the electrically conductive transparent metallic layer;
when the stack is switched from the reflective state to the transparent state, the reflective feature is removed and lithium ions move from the ion conductor layer into the lithium ion storage layer;
when the stack is in the transparent state, the stack consists essentially of only the following layers disposed between the electrically conductive transparent metallic layer and the second electrically conductive transparent layer: the lithium ion storage layer and the ion conductor layer;
the electrically conductive transparent metallic layer has transmissivity to visible light at a wavelength of 550 nm of at least 50 percent;
when the stack is in the transparent state, the stack has transmissivity to visible light at a wavelength of 550 nm of at least 40 percent through a portion of the stack including the electrically conductive transparent metallic layer, the second electrically conductive transparent layer and all layers of the stack disposed between the electrically conductive transparent metallic layer and the second electrically conductive transparent layer; and
when the stack is in the reflective state, the stack has transmissivity of visible light at a wavelength of 550 nm of no greater than 20 percent through the said portion of the stack;
wherein, the electrochromic device is disposed to cover at least a portion of a side of the rigid transparent window sheet.

2. The electrochromic product of claim 1, wherein the reflective feature includes lithium metal.

3. The electrochromic product of claim 1, wherein the reflective feature is disposed at least in part in a portion of the ion conductor layer adjacent the electrically conductive transparent metallic layer.

4. The electrochromic product of claim 1, wherein when the stack is in the transparent state, the ion conductor layer adjoins the electrically conductive transparent metallic layer.

5. The electrochromic product of claim 2, wherein when the stack is in the reflective state, the reflective lithium metal feature adjoins the electrically conductive transparent metallic layer.

6. The electrochromic product of claim 1, wherein the second electrically conductive transparent layer comprises a transparent conducting oxide or a transparent metallic material.

7. The electrochromic product of claim 1, wherein the electrically conductive transparent metallic layer comprises a metallic material including at least one member selected from the group consisting of nickel, a nickel-containing alloy, platinum, and palladium.

8. The electrochromic product of claim 1, wherein the ion conductor layer comprises lithium phosphorous oxynitride or lithium aluminum fluoride, or wherein the lithium ion storage layer comprises lithium nickel tungsten oxide.

9. The electrochromic product of claim 1, wherein:
the reflective feature comprises a layer of lithium metal;
the electrically conductive transparent metallic layer comprises nickel;
the ion conductor layer comprises lithium phosphorous oxynitride; and
the lithium ion storage layer comprises lithium nickel tungsten oxide.

10. The electrochromic product of claim 1, wherein the electrochromic device is adhered to the side of the rigid transparent window sheet.

11. The electrochromic product of claim 1, wherein:
the rigid transparent window sheet is a first rigid transparent window sheet and the product comprises a second rigid transparent window sheet; and
the electrochromic device is disposed between the first rigid transparent window sheet and the second rigid transparent window sheet.

12. The electrochromic product of claim 11, wherein the electrochromic device is spaced from each of the first rigid transparent window sheet and the second rigid transparent window sheet.

13. The electrochromic product of claim 11, wherein:
the first rigid transparent window sheet and the second rigid transparent window sheet are sealed with a window frame; and
the window frame, the first rigid transparent window sheet and the second rigid transparent window sheet form at least a part of a protective enclosure in which is disposed the electrochromic device.

14. The electrochromic product of claim 11, wherein:
the electrochromic product has an exterior side designed to face outside of a structure when the electrochromic product is installed in the structure; and
the electrically conductive transparent metallic film is disposed toward the exterior side relative to the lithium ion storage layer.

15. An electrochromic product, comprising:
a flexible sheet comprising an electrochromic device disposed between two flexible transparent substrates;
wherein the electrochromic device comprises:
a stack of film layers that is switchable between a reflective state and a transparent state through application of an electrical potential across the stack, the stack comprising at least the following:
a lithium ion storage layer;
an ion conductor layer;
an electrically conductive transparent metallic layer; and
a second electrically conductive transparent layer disposed on a side of the lithium ion storage layer opposite the ion conductor layer;
wherein:
when the stack is switched from the transparent state to the reflective state, lithium ions move from the lithium ion storage layer into the ion conductor layer and a reflective feature forms adjacent the electrically conductive transparent metallic layer;
when the stack is switched from the reflective state to the transparent state, the reflective feature is removed and lithium ions move from the ion conductor layer into the lithium ion storage layer;
when the stack is in the transparent state, the stack consists essentially of only the following layers disposed between the electrically conductive transparent metallic layer and the second electrically conductive transparent layer: the lithium ion storage layer and the ion conductor layer;
the electrically conductive transparent metallic layer has transmissivity to visible light at a wavelength of 550 nm of at least 50 percent;
when the stack is in the transparent state, the stack has transmissivity to visible light at a wavelength of 550 nm of at least 40 percent through a portion of the stack including the electrically conductive transparent metallic layer, the second electrically conductive transparent layer and all layers of the stack disposed between the electrically conductive transparent metallic layer and the second electrically conductive transparent layer; and
when the stack is in the reflective state, the stack has transmissivity of visible light at a wavelength of 550 nm of no greater than 20 percent through the said portion of the stack.

16. An electrochromic system comprising:
(i) the electrochromic product of claim 1, wherein the stack of film layers is connected with an electrical power source, wherein the stack is switchable between the reflective state and the transparent state through controlled application of an electrical potential across the stack by the electrical power source; and
(ii) a controller connected with the electrical power source to control application of electrical energy from the electrical power source to the stack to switch the stack between the reflective state and the transparent state;
wherein:
when the electrical power source is controlled by the controller to provide electrical energy to the stack to switch the stack from the transparent state to the reflective state, lithium ions move from the lithium ion storage layer into the ion conductor layer and a reflective lithium metal feature forms adjacent the electrically conductive transparent metallic layer; and
when the electrical power source is controlled by the controller to provide electrical energy to the stack to switch the stack from the reflective state to the transparent state, the reflective lithium metal feature is removed and lithium ions move from the ion conductor layer into the lithium ion storage layer.

17. The electrochromic system of claim 16, wherein:
the reflective state is a first reflective state and the stack is switchable between the first reflective state, the transparent state and a second reflective state through controlled application of the electrical potential across the stack by the electrical power source, the second reflective state being less reflective than the first reflective state;
when the stack is in the second reflective state the stack has transmissivity to visible light at a wavelength of 550 nm of at least 40 percent through the said portion of the stack and transmissivity to infrared light at a wavelength of 1250 nm of not greater than 20 percent through the said portion of the stack; and
when the stack is in the first reflective state the stack has transmissivity to infrared light at a wavelength of 1250 nm of not greater than 20 percent.

18. A method of installing a window in a structure, comprising installing the electrochromic product of claim 1 in the structure.

19. The method of claim 18, wherein the structure is a building or a transportation vehicle.

20. A method for retrofitting a window to include electrochromic functionality, comprising adhering the electrochromic product of claim 15 to a surface of the window.

* * * * *